(No Model.)
R. PARRISH.
HOOF TRIMMING MACHINE.
No. 363,256. Patented May 17, 1887.
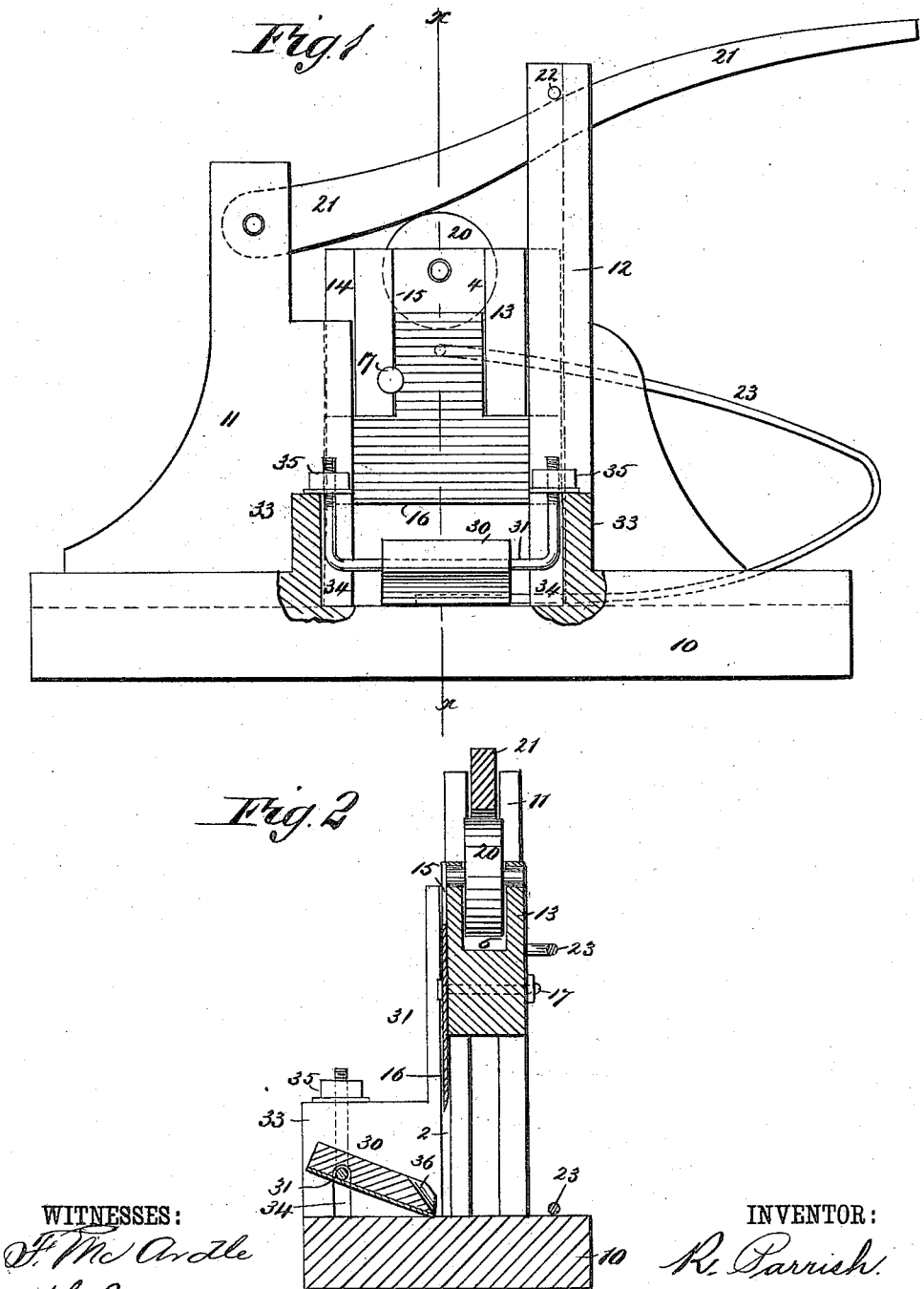
WITNESSES:
F. McArdle
A. E. Brinkerhoff
INVENTOR:
R. Parrish
BY Munn & Co.
ATTORNEYS.

UNITED STATES PATENT OFFICE.

RUFUS PARRISH, OF TROYVILLE, NORTH CAROLINA.

HOOF-TRIMMING MACHINE.

SPECIFICATION forming part of Letters Patent No. 363,256, dated May 17, 1887.

Application filed July 21, 1886. Serial No. 208,639. (No model.)

*To all whom it may concern:*

Be it known that I, RUFUS PARRISH, of Troyville, in the county of Harnett and State of North Carolina, have invented a new and Improved Hoof-Trimming Machine, of which the following is a full, clear, and exact description.

In preparing the hoofs of horses or mules for the attachment of the shoes it is extremely desirable that the edges of the sole of the hoof should be accurately trimmed, so that all parts of the edge shall be in substantially the same plane, and with the ordinary hand process of trimming this end is attained only by skilled workmen, and at best is a slow job; but by the use of such a machine as I am about to describe a proper trimming of the hoof may be had in an instant.

Reference is to be had to the accompanying drawings, forming a part of this specification, in which similar figures of reference indicate corresponding parts in both the figures.

Figure 1 is a side view of the machine, the view being taken in partial section; and Fig. 2 is a sectional elevation taken on line $x$ $x$ of Fig. 1.

In constructing such a machine as the one illustrated in the drawings above referred to I provide a base-plate, 10, to which there are secured two vertical standards, 11 and 12, each standard being slotted so that the two standards act as guides for a vertically-reciprocating block, 13, which is formed with flanges 14, that fit closely within the slots of the standards 11 and 12. One face of the block 13 is formed with a T-shaped recess, 15, in which there is fitted a knife-blade, 16, the lower portion of the knife-blade projecting outward beyond the face of the block and into grooves 2, that are formed in the standards 11 and 12, the knife being held to the block by a bolt, 17, that is formed with a tapering head, as best shown in Fig. 2, the arrangement being such that the knife 16 may be adjusted vertically and locked to place by the bolt 17, which bolt may be brought to bear against one edge of the knife, so that the opposite edge of the knife is forced against the side 4 of the groove 15. A friction wheel or roller, 20, is mounted in a recess, 5, formed in the upper face of the block 13. A lever, 21, is pivotally mounted within the upper slotted end of the standard 11, the projecting end of the lever being guided in the slot formed in the upper end of the standard 12, within which slot the lever may be moved up and down, its upward movement, however, being limited by a pin, 22.

A spring, 23, is fixed to the base-plate 10 and connected to the block 13, the spring being so arranged that the block is normally held in the position in which it is shown in the drawings; but by depressing the lever 21 the block will be forced downward against the tension of the spring, to be returned by the spring when the pressure upon the lever is released.

Just in front of the knife 16 there is mounted a hoof-rest, 30, which is adjustably supported by a U-shaped bar, 31, said bar being in turn supported by arms or blocks 33, that are formed with slots 34, within which the bar rides, the proper adjustment of the bar being obtained by means of nuts 35, arranged as best shown in Fig. 2. In the upper forward edge of the hoof-rest 30 there is a semicircular recess, 36, which is designed to receive the hoof to be trimmed.

In operation the hoof-rest 30 is adjusted so that when the hoof is inserted within the recess 36 it will be in a proper position to receive the required trimming, it being understood that by varying the position of the hoof-rest a preponderance of waste material may be cut from either the heel or the toe of the hoof. After the hoof is in position, as described, the lever 21 is forced downward, in order that the knife 16 may be brought into play to properly trim the hoof.

Although I have described my hoof-trimming machine as mounted upon a base-plate, 10, it will of course be understood that the machine could be mounted on any proper stand; and although I have described specifically the construction illustrated in the drawings, I wish it to be distinctly understood that this construction could be varied without departing from the spirit of my invention.

Having thus described my invention, what I claim as new, and desire to secure by Letters Patent, is—

1. In a hoof-trimming machine, the combination of a sliding and spring-pressed block carrying a knife, a lever for operating the block, an independent and inclined hoof-support in front of the knife, and means for changing the inclination of the said hoof-support with respect to the knife, substantially as herein shown and described.

2. In a hoof-trimming machine, the combination, with the blocks 33, provided with the slots 34, of the hoof-rest 30, the U-shaped bar 31, secured to the foot-rest and working in the slots of the blocks 33, and the nuts 35 on the ends of the said bar, substantially as herein shown and described.

RUFUS PARRISH.

Witnesses:
J. A. STEWART,
J. T. COATS.